Patented July 6, 1926.

1,591,403

UNITED STATES PATENT OFFICE.

ALBERT ROTHMANN, OF HEIDELBERG, GERMANY, ASSIGNOR TO C. F. BOEHRINGER & SOEHNE G. M. B. H., OF MANNHEIM-WALDHOF, GERMANY.

DERIVATIVES OF AMINOBENZOIC ACIDS.

No Drawing. Application filed July 18, 1922, Serial No. 575,829, and in Germany July 20, 1921.

This invention relates to the preparation of derivatives of ortho-aminobenzoic acids which are designed to be used as remedies for gout and other maladies resulting from an excess of uric acid in the human body.

I have found that a specially good reaction is obtained from ortho-aminobenzoic acid derivatives which are substituted in the amino group by a quinoline-carboxylic acid radical.

Compounds of this kind can be prepared by the action of quinoline-carboxylic acid chloride, or of derivatives or substitution products of such, upon anthranilic acid.

It has been demonstrated by clinical experiments that the new condensation products possess in an extraordinarily high degree the power to eliminate uric acid from the system; they produce a much more powerful uric acid rinsing than the 2-phenyl-quinoline-4-carboxylic acid and derivatives of the same hitherto known and generally used as a remedy for gout. They, moreover, exhibit the valuable characteristics of being completely tasteless and of having no undesirable secondary effects as their result.

In the following example I have llustrated what I consider the best manner of carrying my invention into effect.

100 parts of 2-phenyl-quinoline-4-carboxylic acid are suspended in 400 parts of benzene, they are then treated with a solution of 112 parts of thionyl-chloride in 200 parts of benzene and heated on the water bath from 3 to 4 hours with a reflux condenser. After distilling off the solvent and the excess of thionyl-chloride, the residue is dissolved in 800 parts of hot benzene and a hot solution of 65 parts of anthranilic acid in 400 parts of benzene is added, while powerfully stirring the mass. The reaction product is at once separated out for the most part. The reaction mixture is heated a short time on the water bath, the deposit being separated off by suction after cooling and being then dried. It shows a reddish yellow color.

For the further purification the reaction product is suspended in water, heated a short time and thereupon filtered off. This extraction with water is sometimes repeated several times until no more anthranilic acid is discoverable in the filtrate. The precipitate, which by the treatment with water assumes a bright yellow color, is again washed with hot water, filtered under reduced pressure, and dried; it is insoluble in hot water, easily soluble in warm benzene, in chloroform and acetic ester. Recrystallized from alcohol the new compound having the following composition:

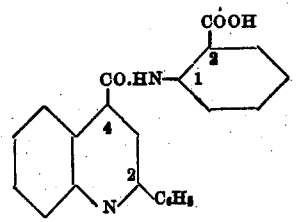

is obtained in the form of fine needles of M.P. 226–227°, C.

I claim as my invention:

1. As a new chemical compound, an ortho-amino-benzoic acid having substituted in the amino-group a compound comprising a quinoline carboxylic acid radical, such compound being solid, tasteless and having the property of rinsing uric acid from the body.

2. As a new chemical compound, an anthranilic acid derivative in which the residue of an aryl-quinoline carboxylic acid is substituted in the amino-group and which corresponds to the formula:

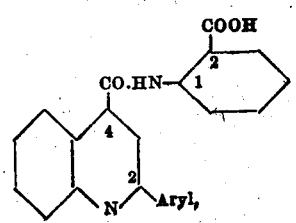

such compound being insoluble in warm water, tasteless, and possessing the property of rinsing uric acid from the system.

3. As a new composition of matter, anthranilic acid substituted in the amino-group by the residue of 2-phenylquinolin-4-carboxylic acid, this substance being insoluble in hot water, readily soluble in warm benzene, in chloroform and in acetic ester and, when recrystallized from alcohol, forming fine needles having a melting point of 226–227°, centigrade, and whose constitution is expressed by the formula:

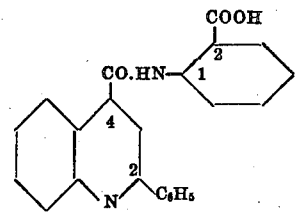

In testimony whereof I hereunto affix my signature.

ALBERT ROTHMANN.